June 6, 1967   J. F. McGRATH, JR   3,324,294
COLLIMATOR FOR ELIMINATING INTERNAL REFLECTIONS COMPRISING
A PLURALITY OF ALIGNED APERTURE ARRAYS
Filed Aug. 13, 1964   2 Sheets-Sheet 1

INVENTOR.
John F. McGrath, Jr.
BY
Roberts, Cushman & Grover
ATT'YS

June 6, 1967 J. F. McGRATH, JR 3,324,294
COLLIMATOR FOR ELIMINATING INTERNAL REFLECTIONS COMPRISING
A PLURALITY OF ALIGNED APERTURE ARRAYS
Filed Aug. 13, 1964 2 Sheets-Sheet 2
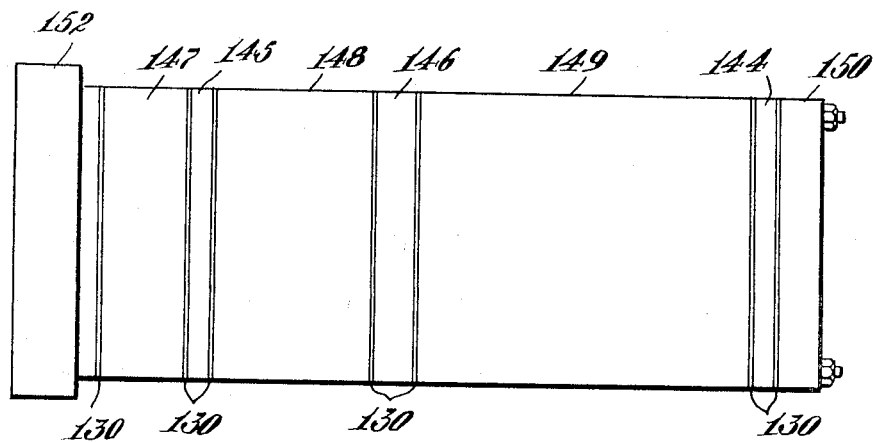
Fig. 7
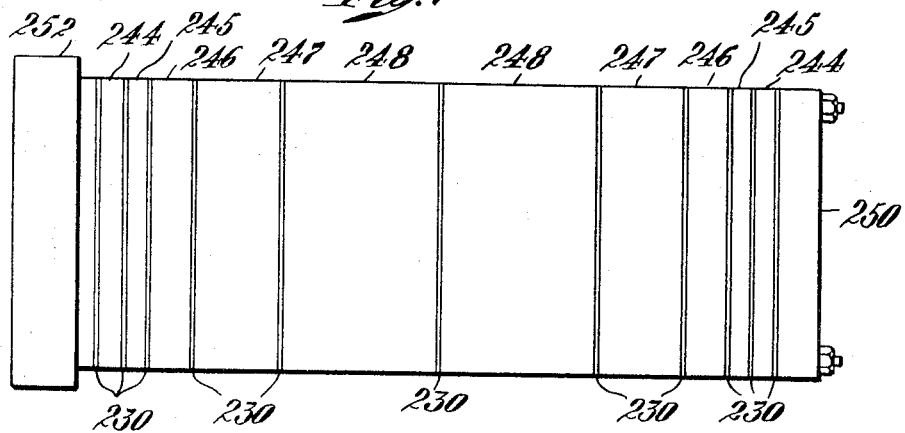
Fig. 8
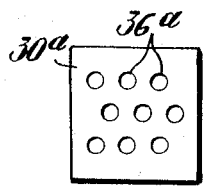 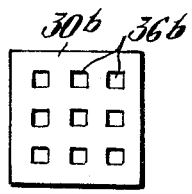 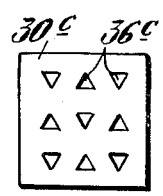 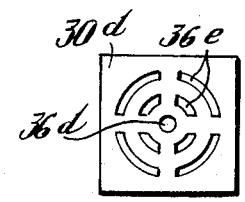
Fig. 9  Fig. 10  Fig. 11  Fig. 12

United States Patent Office 3,324,294
Patented June 6, 1967

3,324,294
COLLIMATOR FOR ELIMINATING INTERNAL REFLECTIONS COMPRISING A PLURALITY OF ALIGNED APERTURE ARRAYS
John F. McGrath, Jr., Arlington, Mass., assignor to Comstock & Wescott, Inc., Cambridge, Mass., a corporation of Massachusetts
Filed Aug. 13, 1964, Ser. No. 389,422
14 Claims. (Cl. 250—105)

This invention relates to optical collimators and more particularly to a collimator useful at the very short wave lengths where refractive and even reflective optics are extremely inefficient. This application constitutes a continuation-in-part of my copending application of the same title, Ser. No. 313,999, filed Oct. 4, 1963, now abandoned.

In the short ultraviolet wave length region bordering on the soft X-ray region, virtually all materials are opaque and highly absorptive. Lenses in the conventional sense cannot be used and diffraction gratings must be used at grazing incidence in order to obtain usable reflectivity.

For such wave lengths the collimation of a beam of radiation must be performed mechanically, that is by physically blocking all possible ray paths except those parallel to the desired optical axis. Typical prior art mechanical collimators involve a plurality of long, narrow and parallel apertures extending the length of the collimator. While this arrangement provides a necessarily complete elimination of all direct rays which deviate from the collimator axis by more than the width of the apertures, the structure is highly prone to internal reflections which permit rays from outside the desired acceptance angle to be passed through the collimator. As will be apparent to those skilled in the art, rays only slightly deviating from the intended acceptance angle will approach a side wall of the aperture at a very shallow angle and, even though the wall material from which the collimator is constructed is highly absorptive, some appreciable reflection will occur owing to the grazing incidence.

The prior art also includes collimators which are made up of a plurality of equally spaced and aligned plates each of which contains a plurality of parallel slit apertures. While such structures reduce the effect, internal reflections from the sides of the conventionally machined slit apertures are still troublesome. Further, when high degrees of collimation are attempted with such an arrangement, by using slit apertures which are very narrow in relation to the length of the collimator, difficult problems of registration and alignment are presented.

Objects of the present invention are to provide an optical collimator generally of the spaced plate variety which is capable of high angular resolution, in which internal reflections are virtually eliminated, which can be assembled without severe problems of registration and alignment, and which employs a minimum number of precision components.

According to one aspect, the invention provides a collimator involving a plurality of aligned aperture arrays, each of which is formed by photoetching a thin metal sheet so as to form sharp-edged undercut apertures. By forming the apertures in this way, surfaces which could cause internal reflections are eliminated and there is left only a sharp edge which disperses an insignificant amount of radiation by diffraction.

In another aspect, the invention provides that the aperture arrays are formed by photoetching from a common master and that the photoetching also forms registration surfaces on the arrays for contact with an appropriate linear registration means whereby the arrays can be easily and accurately aligned relative to an optical axis defined by the linear registration means.

To minimize the number of precision components required, the invention further contemplates a spacing arrangement of the arrays along the optical axis such that the spacings $s$ between arrays include each of the values of $$s = \frac{l}{2n}$$

for which $n$ is an integer between zero and $a-1$ (non-inclusive) where $a$ is the number of arrays and $l$ is the total length of the collimator.

For the purpose of illustration preferred embodiments of the invention are shown in the accompanying drawing in which FIG. 1 is a somewhat schematic plan view of a scanning ultraviolet monochromator;

FIG. 7 is a side view of a modification of the collimator of FIG. 3;

FIG. 8 is a side view of a further modification of the collimator of FIG. 3; and FIGS. 9 to 12 are plan views, like FIG. 5, of further forms of collimator aperture arrays.

Figure 1:
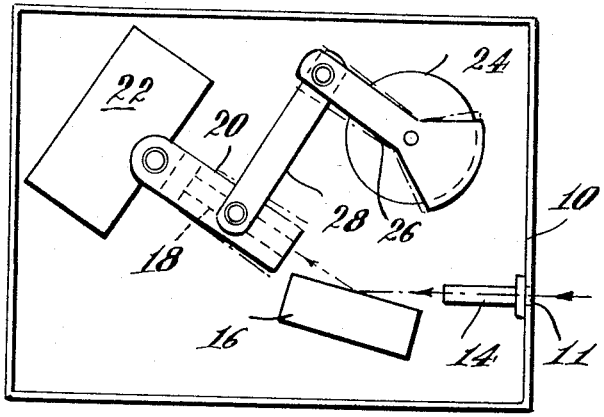
Figure 4:
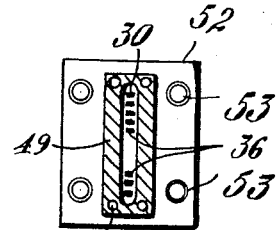
FIG. 4 is a section on the line 4—4 of FIG. 3.
Figure 2:
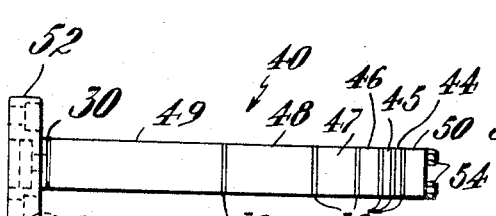
FIG. 2 is a top view of a collimator.
Figure 3:
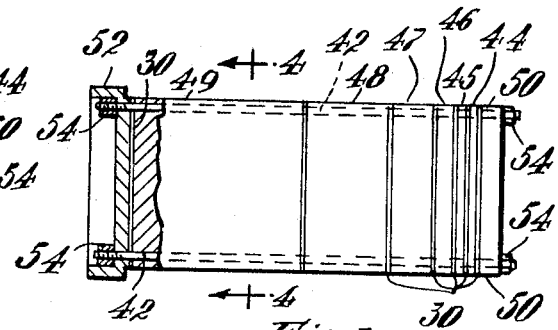
FIG. 3 is a side view of the collimator partially broken away.
Figure 5:
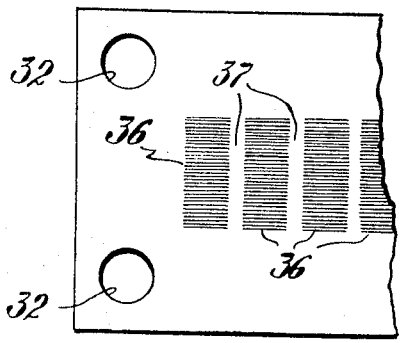
FIG. 5 is a plan view of a collimator slit aperture array.
Figure 5:
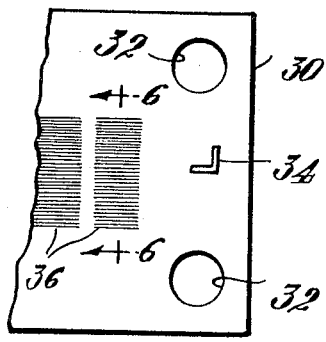

FIG. 1 illustrates an application to which the collimator according to the invention is particularly suited. This particular apparatus is designed to analyze ultraviolet radiation from the sun as incident upon an unmanned observatory orbiting the earth. In this apparatus radiation falling upon an aperture 11 in the housing 10 passes through a collimator 14, which blocks all rays which are not parallel to the desired optical axis, and illuminates the face of a plane grating 16. A second collimator 18 is attached to an arm 20 arranged to pivot about the photosensitive surface of a photodetector device 22. A stepping motor 24 carrying a counterbalanced crank arm 26 is connected to the pivoted collimator arm 20 by means of a link 28 and is arranged so that the operation of the motor causes the collimator 18 to incrementally scan the ruled face of the grating 16 and to accept radiation diffracted at different angles from the grating. As the angle at which the diffracted radiation is accepted from the grating 16 changes during scanning, the wave length of the radiation received by the photodetector device 22 also changes in a manner well understood by those skilled in the art of spectroscopy. Using collimators of the type described herein, a scanning monochromator similar to that shown in FIG. 1 can be constructed of a size such that the casing dimensions shown in FIG. 1 are three inches by four inches.

FIGS. 2–6 illustrate one form of the collimator construction with which the present invention is particularly concerned. The collimator utilizes a series of grids or slit arrays 30 which are photoetched through thin metal stock in the pattern shown in FIG. 5. The preferred pattern illustrated encompasses four mounting and aligning holes 32, one at each corner of the array, and an L-shaped orientation indicia 34 as well as a plurality of equally-spaced parallel slits 36 in a collinear group. In the embodiment illustrated several collinear groups of slits are provided and are separated by bars 37. The several groups can function together as one large collimator or can operate independently in cooperation with separate grating surfaces and photodetectors. The photoetching process is carried out in such a manner that the slits 36 are undercut in the manner shown in FIG. 6 on the exit sides of the slits. The degree of undercutting is preferably such that the nominal sides of the slit form an angle of approximately 20 degrees with a perpendicular to the face of the array. Such a photoetching process is itself entirely conventional and can be performed without difficulty by those skilled in the art of photoengraving for printing purposes, i.e., offset.

To form a complete collimator 40 a series of the slit arrays 30 are assembled in aligned relationship on straight cylindrical rods 42 with intervening spacers 44–49. The assembly is completed with an end-cap 50 and a mounting bracket 52, the assembly being held together by nuts 54 fitting threaded ends on the rods 42. The bracket 52 is provided with countersunk apertures 53 by means of which the collimator 40 can be mounted.

The alignment of the various slit arrays 30 is established by the engagement of the edges of the holes 32 with the rods 42. Since the edges of the holes 32 are formed photographically from a common master which insures a near-perfect identity of location between individual pieces and since the rods 42 can easily be made nearly perfectly linear, the alignment or registration of corresponding slits within the assembled collimator is correspondingly accurate. This aspect of the invention can also be practiced by producing the slits and aligning surfaces in each array by electroforming from a common photographic master in conventional manner.

Figure 6:
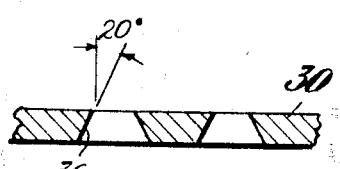
FIG. 6 is a section on enlarged scale on the line 6—6 of FIG. 5.

The etched arrays 30 are assembled with the smaller sides of the apertures 36 facing the incoming radiation. The non-symmetrical L-shaped indicia 34 facilitates this assembly by uniquely identifying the sides of the array, since visual inspection of the very small slits themselves can be easily misleading. Since the photoetching process forms a quite sharp edge at the surface of the array facing the incoming radiation and also causes the side walls of each slit aperture to fall away from the desired optical path as shown in FIG. 6, there is virtually no scattering or internal reflection at the slit apertures.

The degree of collimation is, of course, determined by the length $l$ of the collimator, that is the distance separating the two endmost grid arrays 30, and the width $w$ of the individual slits 36. The angle of acceptance $\alpha$ is then $$\alpha = 2 \tan^{-1} \frac{w}{l}$$

According to another aspect of the invention, the intermediate slit arrays necessary to eliminate off-axis light paths through the collimator are spaced along the optical axis of the collimator in a progressive pattern such that the number of these precision arrays required is minimized. In the embodiment illustrated, the first intermediate array 30 is placed midway between the two endmost arrays and each of the other intermediate arrays is placed midway between a chosen one of the end arrays and the preceding intermediate array. In other words the arrays 30 are spaced according to a pattern in which each spacing is one-half the length of the preceding spacing, there being two of the smallest spacing. The number of so-arranged arrays 30 necessary to totally eliminate off-axis light paths is the integer equal to or next greater than $$\frac{\log b}{\log 2} + 2$$

where $b$ is the number of parallel slits 36 in each array 30. Stated conversely $a$ arrays arranged according to the pattern described above will eliminate all off-axis light paths for arrays having up to $2^{(a-2)}$ equally spaced parallel slit apertures. These relationships hold true for slit apertures which are in width equal to or less than half the distance between adjacent slit centers. In this particular example illustrated in FIGS. 2–5, seven arrays 30 are employed each of which is provided with thirty-two parallel slit apertures.

As the problem of eliminating off-axis light paths is essentially that of blocking those angularly disposed paths which would permit light to pass through non-corresponding slits in different arrays, it is not necessary that the arrays 30 be arranged so that the spacings between arrays get narrower as one end is approached. Rather, it is only necessary that all of the spacing provided by the above described arrangement be utilized. In other words in a collimator of length $l$ having $a$ aligned slit arrays, each of which contains $2^{(a-2)}$ slits, the requirement is that the spacings $s$ between adjacent arrays be such as to include all values of $$s = \frac{l}{2n}$$

for which $n$ is an integer between, but not including, 0 and $a-1$. With a given number $a$ of arrays 30 postulated for a collimator of length $l$ this requirement will of course yield two equal spacings of the smallest size, one being dictated by the formula and the other being the residue of the length $l$ after the spacings postulated by the formula are subtracted therefrom. FIG. 7 illustrates an embodiment, essentially identical in operation with the device illustrated in FIG. 3, in which the same spacings have been more randomly distributed. Corresponding reference characters have been used to facilitate the illustration of similarity with like numbered elements in FIGS. 1 to 6.

While the arrangements of slit arrays described above reduce the number of arrays required to a minimum, it is of course possible to arrange a collimator using extra arrays so as to obtain a redundancy of off-axis light path elimination while still utilizing the principles of the invention, for example, by spacing the arrays in even sub-multiples of the length of the collimator so as to reduce the number of arrays required below the number of parallel slit apertures in each array.

A particularly simple and useful example of such a redundant arrangement, which provides an even more complete elimination of light which might be passed by multiple internal reflections within the collimator, is illustrated in FIG. 8. This arrangement is similar to the device illustrated in FIGS. 2–4 except that the essentially open left-hand half of the collimator of FIG. 3 has been replaced by an inverted version of the right-hand half. Corresponding reference characters have again been applied to elements corresponding to those in FIGS. 1 to 7.

As previously stated the spacing relationships of the slit arrays apply where the slit apertures of the arrays are in width equal to or less than half the distance between adjacent slit centers. That is, the distance between slit edges must be equal to or greater than the slit width. These array and aperture relationships apply also where the apertures are of other geometric configurations.

Examples of other undercut aperture configurations are shown in FIGS. 9 to 12. A plurality of such identical arrays will be disposed along the light path through the collimator in any of the relationships described with respect to FIGS. 1 to 8.

In FIG. 9 the array 30$a$ is composed of staggered circular openings 36$a$. Here the spacing between centers of any two adjacent apertures is at least twice the diameter of the apertures.

In FIG. 10 the array 30$b$ is composed of symmetrically disposed rectangular apertures 36$b$. In FIG. 11 the array 30$c$ comprises triangular apertures 36$c$ oppositely oriented in vertical columns.

In FIG. 12 the array 30$d$ has a central circular aperture 36$d$ and interrupted concentric rings 36$e$. Such an array is designed for collimation along any radial line drawn from the central aperture, but not necessarily along any other line.

Each of the arrays illustrated and shown conforms to the array and aperture relationships disclosed. Other arrays in which the apertures are non-geometric or of random shapes are also useful if the several arrays in a collimator are substantially identical as is possible by electroforming from a master, and if the arrays conform to the described relationships.

Accordingly, it should be understood that this disclosure is for the purpose of illustration only and that the invention includes all modifications and equivalents falling within the scope of the appended claims.

I claim:

1. A collimator of length $l$ comprising: a plurality of $a$ aligned aperture arrays, each array containing $2^{(a-2)}$ apertures, the width of each aperture being less than half the distance between adjacent aperture centers, the spacings $s$ between arrays being such as to include all values of $$s = \frac{l}{2n}$$

for which $n$ is an integer between 0 and $a-1$.

2. A collimater of length $l$ comprising: a plurality of $a$ aperture arrays, each array including a plurality of $2^{(a-2)}$ spaced apertures, the spacings $s$ between adjacent arrays being such as to include each of the values of $$s = \frac{l}{2n}$$

for which $n$ is an integar between 0 and $a-1$.

3. A collimater of length $l$ comprising: a plurality of $a$ aperture arrays, each array containing $2^{(a-2)}$ spaced apertures, the width of each aperture being less than half of the distance between adjacent aperture centers, and the spacings $s$ of the intermediate aperture arrays from one end of the collimator being $$s = \frac{l}{2n}$$

$n$ being the integer between 0 and $a-1$.

4. A collimator comprising a plurality of aligned aperture arrays each of which includes a plurality of spaced apertures, the width of each aperture being less than half of the distance between adjacent aperture centers, in which one intermediate aperture array is located midway between the end arrays and each other intermediate array is spaced half way between a chosen array and the preceding intermediate array.

5. A collimator comprising a plurality of aligned aperture arrays, each of which includes a plurality of spaced apertures, the width of each aperture being less than half the distance between adjacent aperture centers, in which the spacings between adjacent aperture arrays are even submultiples of the length of the collimator and the number of arrays is less than the number of apertures in each array.

6. A collimator of length $l$ comprising: a plurality of $a$ aligned aperture arrays, each array being a thin metal diaphragm including $2^{(a-2)}$ spaced apertures, the apertures being undercut relative to one end of the collimator by photoetching and being in width less than half the distance between adjacent aperture centers, the spacings $s$ between adjacent arrays being such as to include all values of $$s = \frac{l}{2n}$$

for which $n$ is an integer between 0 and $a-1$.

7. A collimator of lentgh $l$ comprising: a plurality of $a$ aligned aperture arrays, each array being a thin metal diaphragm including $2^{(a-2)}$ spaced apertures and at least two registration surfaces, said apertures and said registration surfaces being formed photographically from a common master; linear registration means for engaging the registration surfaces on said arrays; and means for spacing said arrays along said registration means such that the spacings $s$ between arrays include all of the values of $$s = \frac{l}{2n}$$

for which $n$ is an integer between 0 and $a-1$.

8. A collimator according to claim 7 in which said apertures are undercut relative one end of the collimator by said photoetching whereby internal reflections from the edges of said slit apertures are eliminated.

9. A collimator of length $l$ comprising: a plurality of $a$ aligned slit arrays, each array containing $2^{(a-2)}$ equally spaced parallel slits, the width of each slit being less than half the distance between adjacent slit centers, the spacings $s$ between arrays being such as to include all values of $$s = \frac{l}{2n}$$

for which $n$ is an integer between 0 and $a-1$.

10. A collimator of length $l$ comprising: a plurality of $a$ aligned slit arrays, each array including a plurality of $2^{(a-2)}$ equally spaced parallel slits, the spacings $s$ between adjacent arrays being such as to include each of the values of $$s = \frac{l}{2n}$$

for which $n$ is an integer between 0 and $a-1$.

11. A collimator of length $l$ comprising: a plurality of $a$ aligned slit arrays, each array containing $2^{(a-2)}$ equally spaced parallel slits, the width of each slit being less than half of the distance between adjacent slit centers, and the spacings $s$ of the intermediate slit arrays from one end of the collimator being $$s = \frac{l}{2n}$$

$n$ being the integer between 0 and $a-1$.

12. A collimator comprising a plurality of aligned slit arrays each of which includes a plurality of equally spaced parallel slit apertures, the width of each slit being less than half of the distance between adjacent slit centers, in which one intermediate slit array is located midway between the end arrays and each other intermediate array is spaced half way between a chosen array and the preceding intermediate array.

13. A collimator comprising a plurality of aligned slit arrays, each of which includes a plurality of equally spaced parallel slit apertures, the width of each slit aperture being less than half the distance between adjacent slit centers, in which the spacings between adjacent slit arrays are even submultiples of the length of the collimator and the number of arrays is less than the number of parallel slit apertures in each array.

14. A collimator comprising: a plurality of aligned slit arrays, each array including a plurality of equally spaced parallel slits and at least one registration surface, said slits and said registration surface in each array being formed photographically from a common master; and linear registration means for engaging the registration surfaces on said arrays, whereby the slits in the various arrays may be placed in exact registration relative to the optical axis of the collimator by engagement of the registration surfaces thereof with said linear registration means.

References Cited

UNITED STATES PATENTS

| | | | |
|---|---|---|---|
| 1,792,046 | 2/1931 | Skaupy | 88—14 |
| 2,558,492 | 6/1951 | Lely et al. | 250—105 |
| 3,040,175 | 6/1962 | Kern | 250—105 |

RALPH G. NILSON, *Primary Examiner.*

A. L. BIRCH, *Assistant Examiner.*